United States Patent
Kodera et al.

Patent Number: 5,455,695
Date of Patent: Oct. 3, 1995

[54] PROCESS FOR PRODUCING LIQUID CRYSTAL DEVICE INCLUDING RUBBING WITH TWO RUBBING ROLLERS ROTATING IN SAME DIRECTIONS AT DIFFERENT SPEEDS

[75] Inventors: Yasuto Kodera, Fujisawa; Tadashi Mihara, Isehara; Takatsugu Wada, Atsugi, all of Japan

[73] Assignee: Canon Kabushiki Kaisha, Tokyo, Japan

[21] Appl. No.: 281,537

[22] Filed: Jul. 28, 1994

Related U.S. Application Data

[63] Continuation of Ser. No. 9,738, Jan. 27, 1993, abandoned.

[30] Foreign Application Priority Data

Jan. 27, 1992 [JP] Japan .................. 4-034031
Jan. 31, 1992 [JP] Japan .................. 4-040607

[51] Int. Cl.$^6$ .................. G02F 1/337; G02F 1/13
[52] U.S. Cl. .................. 359/76; 359/78; 359/100
[58] Field of Search .................. 359/76, 78, 62, 359/100

[56] References Cited

U.S. PATENT DOCUMENTS

| | | | |
|---|---|---|---|
| 4,367,924 | 1/1983 | Clark et al., .................. | 350/334 |
| 5,035,491 | 7/1991 | Kawagishi et al. .................. | 350/350 S |
| 5,151,804 | 9/1992 | Verhulst et al. .................. | 359/76 |
| 5,172,255 | 12/1992 | Brosig et al. .................. | 359/78 |
| 5,182,662 | 1/1993 | Mihara .................. | 359/63 |
| 5,221,981 | 6/1993 | Kodera et al. .................. | 359/76 |

FOREIGN PATENT DOCUMENTS

| | | | |
|---|---|---|---|
| 61-249021 | 11/1986 | Japan .................. | 359/76 |
| 64-55527 | 3/1989 | Japan .................. | 359/76 |
| 64-55529 | 3/1989 | Japan .................. | 359/76 |
| 1-161313 | 6/1989 | Japan .................. | 359/76 |
| 2-219027 | 8/1990 | Japan .................. | 359/76 |
| 4-081720 | 3/1992 | Japan .................. | 359/76 |
| 4-119325 | 4/1992 | Japan .................. | 359/76 |

*Primary Examiner*—Anita Pellman Gross
*Attorney, Agent, or Firm*—Fitzpatrick, Cella, Harper & Scinto

[57] ABSTRACT

A liquid crystal device, particularly a ferroelectric liquid crystal device, with improved homogeneity of initial alignment and bistability is provided by using an alignment film formed by rubbing with at least two rubbing rollers rotating at different speeds. Further a liquid crystal device, particularly a ferroelectric liquid crystal device, with improved drive characteristic as well as suppressed liquid crystal movement is provided by using an alignment film formed by plural times of rubbing under different conditions.

24 Claims, 2 Drawing Sheets

PROCESS FOR PRODUCING LIQUID CRYSTAL DEVICE INCLUDING RUBBING WITH TWO RUBBING ROLLERS ROTATING IN SAME DIRECTIONS AT DIFFERENT SPEEDS

This application is a continuation of application Ser. No. 08/009,738 filed Jan. 27, 1993 now abandoned.

FIELD OF THE INVENTION AND RELATED ART

The present invention relates to a process for producing a liquid crystal device for use in display devices, optical devices, etc., and an electrode plate therefor, more particularly to a process for producing a ferroelectric liquid crystal device and an electrode plate therefor.

Clark and Lagerwall have proposed a liquid crystal device showing bistability (U.S. Pat. No. 4,367,924, etc.).

As the liquid crystal showing bistability, ferroelectric liquid crystals having chiral smectic C phase (SmC*) or H phase (SmH*) are generally used. This type of liquid crystal shows bistable states including a first optically stable state and a second optically stable state in response to an electric field applied thereto. Accordingly, as different from a TN-type liquid crystal used in a conventional liquid crystal device, the ferroelectric liquid crystal is oriented to the first optically stable state in response to an electric field of one direction and oriented to the second optically stable state in response to an electric field of the opposite direction. Further, the liquid crystal quickly responds to an electric field applied thereto to assume either one of the first and second optically stable states and retains the resultant state in the absence of an electric field, thus showing bistability. The liquid crystal also shows a quick responsiveness to a change in electric field and is thus expected to be widely used for constituting a high speed and memory-type display device. Further, the ferroelectric liquid crystal provides a substantial improvement in viewing angle characteristic which is poor in conventional TN-type liquid crystal devices.

A display device of this type is generally constituted by disposing a chiral smectic liquid crystal between a pair of substrates or electrode plates respectively having one and the other of a group of scanning electrodes and a group of data electrodes for multiplexing drive of the liquid crystal, wherein a scanning signal is sequentially applied to the scanning electrodes and data signals are applied to the data electrodes in synchronism with the scanning signal.

In the process of producing a ferroelectric liquid crystal device showing bistability as described above, the electrode plates are subjected to an aligning treatment. The aligning treatment is performed so as to provide a homogeneous initial molecular arrangement for establishing good bistability through appropriate alignment control.

The aligning treatment may be effected by, e.g., application of an aligning agent, oblique evaporation, ion beam method, plasma method and rubbing method, among which the rubbing method, wherein an electrode plate surface is lightly rubbed with a rubbing cloth in one direction, is relatively simple and common. However, in the case of applying the rubbing method wherein a rubbing cloth wound about a cylindrical roller is used to rub an alignment film formed on an electrode plate, there has been sometimes encountered a difficulty that alignment irregularity in the form of stripes occurs at a certain pitch in a direction perpendicular to the rubbing direction, thus failing to provide a homogeneous alignment state over the entire area of a panel.

This might be attributable to off-centering or axial deviation of the rubbing roller, or periodical vibration of the rubbing apparatus causing a failure in uniform contact of the cloth onto the alignment film.

However, it is very difficult to completely remove the axial deviation of the rubbing roller.

Further, when a ferroelectric liquid crystal device of the above described type is continually driven for a long period, there has been encountered a problem that the device in a cell structure causes coloring into yellow (yellowing) along a cell side due to gradual increase in cell thickness.

SUMMARY OF THE INVENTION

In view of the above-mentioned problem encountered in the conventional rubbing treatment, an object of the present invention is to provide a process for producing a liquid crystal device, particularly a ferroelectric liquid crystal device, retaining a homogeneous alignment state over an entire panel area and free from alignment irregularity in the form of stripes occurring in a direction perpendicular to the rubbing direction.

Another object of the present invention is to provide a process for producing a liquid crystal device, particularly a ferroelectric liquid crystal device capable of preventing a local change in cell thickness due to liquid crystal drive.

According to the present invention, there is provided a process for producing a liquid crystal device of the type including a liquid crystal disposed between a pair of electrode plates each having an alignment film thereon for aligning the liquid crystal, comprising: rubbing the alignment film on at least one electrode plate with at least two rubbing rollers including at least two rubbing rollers rotating at different speeds, each rubbing roller comprising a rubbing cloth wound about a roller.

The present invention also provides a process for producing a liquid crystal device of the type including a liquid crystal disposed between a pair of electrode plates each comprising transparent electrodes and an alignment film successively disposed on a substrate, comprising: rubbing the alignment film with a rubbing roller plural times under different conditions.

The present invention further provides a process for producing a pair of electrode plates for constituting a liquid crystal device of the type including a liquid crystal disposed between the electrode plates, comprising: forming an alignment film on each of the electrode plates, and rubbing the alignment film on at least one electrode plate with at least two rubbing rollers including at least two rubbing rollers rotating at different speeds, each rubbing roller comprising a rubbing cloth wound about a roller.

The present invention further provides a process for producing an electrode plate for a liquid crystal device of the type including a liquid crystal disposed between a pair of such electrode plats each comprising transparent electrodes and an alignment film successively disposed on a substrate, comprising: rubbing the alignment film with a rubbing roller plural times under different conditions.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
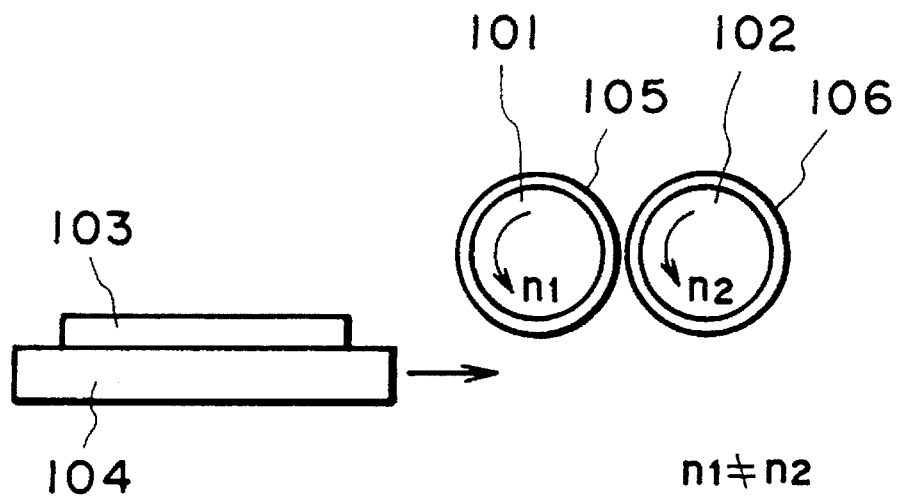
FIG. 1 is an illustration of an alignment treating method for a ferroelectric liquid crystal device according to the present invention.

In the present invention, the above-mentioned rubbing treatment is applied to a single electrode plate plural times by changing at least one condition among the rubbing roller rotation speed, rubbing density and pressing depth (or degree of pressing).

The process of the present invention will be described in further detail below.

According to our study, the yellowing of a cell due to a cell thickness increase is recognized to be caused by a local increase in cell pressure due to the movement of the liquid crystal itself during drive. Presumably, such a force causing the liquid crystal molecule movement may be attributable to an electrodynamic effect caused by perturbation of liquid crystal dipole moments under application of an AC-like voltage caused by continuation of drive pulses. Further, according to our experiments, it has been found that the readiness of the liquid crystal molecular movement is remarkably affected by the alignment control force, particularly the surface state or shape of the alignment film, and a rougher surface tends to provide a higher effect of suppressing the liquid crystal movement.

The liquid crystal alignment is governed by a combination of a physical shape effect due to rubbing and a chemical effect. The pressing depth of a rubbing cloth against a substrate (electrode plate) principally affects the physical shape effect. The rubbing density $\rho$ (non-dimensional number) may be given by the equation of:

$$\rho = (N\pi D + v)/|v|,$$

wherein N denotes a number of revolutions (rps), D denotes a roller diameter (mm), and v denotes a relative translational moving speed between the substrate and the roller. The rubbing density principally affects the chemical effect. The rubbing conditions do not completely independently contribute to the two effects but roughly the above-mentioned relationships exist.

If a single substrate is subjected to plural times of rubbing, the alignment is principally affected by the conditions of the final rubbing.

Accordingly, in the present invention, an alignment film is provided with a surface shape for preventing liquid crystal movement principally in first rubbing, and imparted with a chemical effect affecting the liquid crystal alignment principally in second rubbing in order to prepare a liquid crystal cell which suppresses the above-mentioned liquid crystal movement and is also provided with good alignment leading to good drive characteristic. More specifically, in the present invention, a substrate is treated at least two times of rubbing including first rubbing performed under a rubbing density $\rho_1$ and a pressing depth $P_1$ against the substrate, and second rubbing performed under a rubbing density $\rho_2$ and a pressing depth $P_2$ satisfying relationships of $\rho_1 < \rho_2$ and $P_1 > P_2$. As a result, good alignment and drive characteristic are attained while minimizing the liquid crystal movement. Incidentally, a larger rubbing density provides a larger alignment control force if the same rubbing roller and alignment film are used.

Further, in an embodiment of the process according to the present invention for producing a liquid crystal device of the type including a liquid crystal disposed between a pair of electrode plates each having an alignment film thereon for aligning the liquid crystal, good alignment is accomplished by rubbing the alignment film on at least one electrode plate with at least two rubbing rollers including at least two rubbing rollers rotating at different speeds.

FIG. 1 is a schematic view for illustrating an embodiment of the alignment treating method for a ferroelectric liquid crystal device according to the present invention. Referring to FIG. 1, reference numerals 101 and 102 denote a first and a second rubbing roller each comprising a rubbing cloth 105 or 106 wound about a cylindrical roller, which are used for rubbing a substrate (electrode plate) surface coated with an alignment film and disposed on a stage 103.

In the present invention, the rubbing treatment is performed by rubbing the surface of the substrate 103 with rubbing cloths wound about the first and second rubbing rollers 101 and 102 by relatively moving the stage 104 carrying the substrate 103 and the rubbing rollers parallel to each other while rotating the rubbing rollers 101 and 102 at different speeds, $n_1$ and $n_2$, respectively.

FIG. 1 shows only two rubbing rollers, but more rubbing rollers can be used. The use of two to four rollers is preferred, wherein at least two rollers are rotated at different speeds. The diameters of plural rollers used can be the same or different. The relative sizes of the rollers do not restrict the present invention.

As has been described hereinbefore, if a rubbing treatment is performed by using a single rubbing roller or plural rubbing rollers rotated under identical speeds of the same direction, an alignment irregularity occurs at a certain pitch in a direction perpendicular to the rubbing direction due to a certain relationship concerning a relative moving speed between the substrate and the roller arising from an axial deviation of the rubbing roller or a periodical vibration of the rubbing apparatus. However, if the rubbing treatment is performed plural times (ordinarily, several times to ten times) while changing the rubbing conditions as described above according to the present invention, the abovementioned alignment irregularity does not occur at all. In the present invention, the above-described rubbing treatment can be applied to at least one of a pair of substrates constituting a ferroelectric liquid crystal device, whereas it is further preferred to apply the rubbing treatment to both substrates.

Further, in case where the alignment irregularity is caused by an axial deviation of the rubbing roller, it is preferred that the numbers of revolutions of the rubbing rollers are varied so that they do not provide a simple ratio of integers, particularly not such a ratio that one can be obtained by multiplying the other with an integer, i.e., one is not an aliquot of the other.

In case where the rubbing density and the pressing depth of the rubbing roller (i.e., an amount of pressing the rubbing roller (cloth) against the substrate from a basic position where the rubbing roller first contacts the substrate), it is particularly preferred that a surface unevenness for suppressing the liquid crystal movement is provided to a substrate by the first rubbing and an aligning treatment is effected by a subsequent rubbing. As described above, there is a tendency that a final rubbing effectively affects the resultant alignment performance, so that it is preferred to weaken the alignment control force by using a smaller rubbing density in the rubbing treatment for imparting an unevenness and effect an optimum rubbing in the subsequent rubbing.

In the case where different rotation speeds, particularly different numbers of revolutions per unit time, are used, the former rubbing can have a larger speed than the latter or vice versa. This can be appropriately determined depending on the kind of the rubbing cloth (material, length of pile yarn constituting the cloth, etc.) and the material of the alignment film to be rubbed therewith, while taking into consideration a factor that a final rubbing treatment predominantly affects the resultant alignment performance.

Hereinbelow, the present invention will be described more specifically with reference to Examples and Comparative Examples.

EXAMPLES 1–2 AND COMPARATIVE EXAMPLES 1–2

A 1.1 mm-thick glass plate (substrate) was provided with transparent electrodes (ITO) in the form of stripes and coated with an about 1000 Å-thick $SiO_2$ film as an insulating film by sputtering and then with a polyimide-forming liquid, followed by baking to form an about 200 Å-thick polyimide film as an alignment film.

Four pairs of substrates were treated in this manner.

Then, the substrates (electrode plates) each carrying the alignment film were subjected to successive rubbing with two rubbing rollers each having a rubbing cloth comprising nylon pile yarn of 1.5 denier and 1.5 mm in length, wound about an 80 nm-dia. cylindrical roller arranged as shown in FIG. 1, respectively under a pressing depth of 0.35 mm of the rubbing cloth against the substrate. As other rubbing conditions, the four pairs of substrates were treated under four sets of conditions (1)–(4) (for Examples 1–2 and Comparative Examples 1–2, respectively) including a substrate moving speed V (mm/sec), a number of revolutions $n_1$ (rpm) for the first rubbing roller and a number of revolutions $n_2$ (rpm) for the second rubbing roller, respectively as shown in the following Table 1.

TABLE 1

| | Conditions | V (mm/s) | $n_1$ (rpm) | $n_2$ (rpm) |
| --- | --- | --- | --- | --- |
| Example 1 | (1) | 50 | 1000 | 900 |
| Example 2 | (2) | 30 | 700 | 650 |
| Comp. Example 1 | (3) | 50 | 1000 | 1000 |
| Comp. Example 2 | (4) | 30 | 700 | 700 |

Then, on one of each pair of substrates were dispersed 1.5 μm-dia. silica beads as spacers, and the other substrate carrying a sealing adhesive applied thereto at the periphery was applied thereto almost parallel to each others. Thus, four liquid crystal cells were prepared and were respectively filled with a phenylpyrimidine-based mixture ferroelectric liquid crystal showing the following phase transition series to form four liquid crystal cells.

$$Cryst. \xrightarrow{-8.5° C.} Sm*C \xrightarrow{66° C.} SmA \xrightarrow{88° C.}$$

-continued $$Ch. \xrightarrow{94.4° C.} Iso.$$

Then, each liquid crystal cell was heated to isotropic phase and then cooled to chiral smectic C phase. Then, each cell was sandwiched between cross-nicol polarizers to observe an alignment state of the liquid crystal.

As a result, the cells prepared through rubbing under the conditions (3) and (4) (Comparative Examples 1–2) were found to be accompanied with an alignment irregularity involving white and black stripes appearing alternately at pitches of about 3 mm (for conditions (3)) and about 2.6 mm (for conditions (4)), respectively in a direction perpendicular to the rubbing direction. The pitches corresponded to distances of movement of the substrates during one rotation of the rubbing roller, thus being assumed to be attributable to an axial deviation of the rollers or periodical vibration of the apparatus.

On the other hand, the cells prepared through rubbing under the conditions (1) and (2) (Examples 1–2) according to the present invention, were found to be completely free from occurrence of stripe-shaped alignment irregularity and to involve mottles of white and black states distributed isotropically.

EXAMPLE 3

Figure 2:
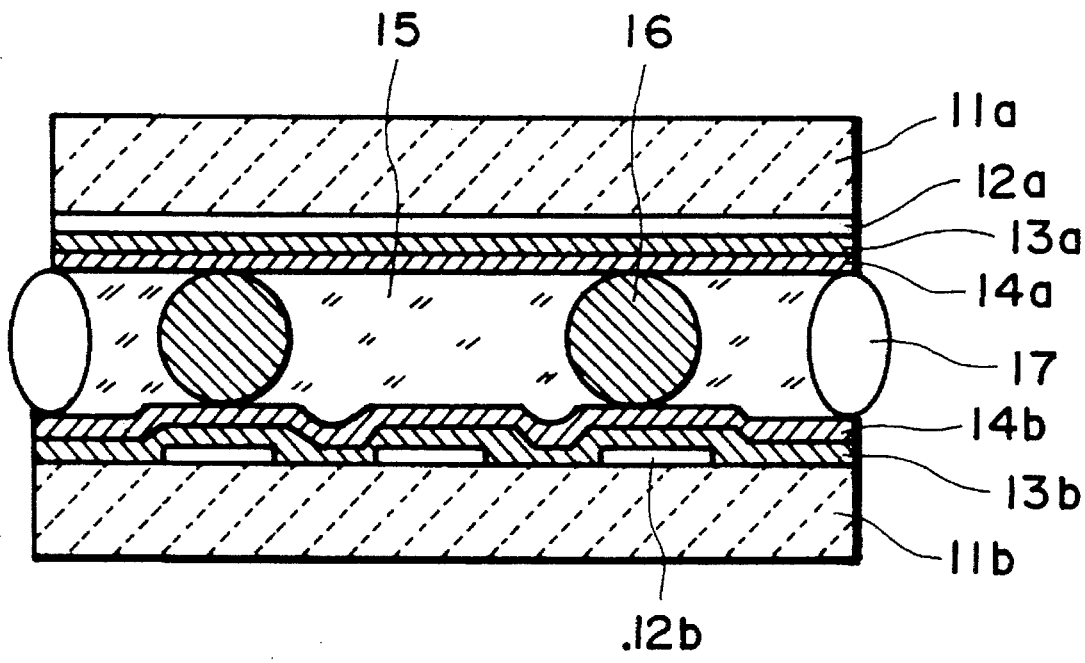
FIG. 2 is a sectional view of a ferroelectric liquid crystal device produced by the process according to the present invention.

FIG. 2 is a schematic sectional view of a ferroelectric liquid crystal cell prepared according to a process of the present invention. Referring to FIG. 2, the liquid crystal cell includes a pair of glass plates 11a and 11b respectively provided with transparent electrodes 12a and 12b of, e.g., $In_2O_3$ or ITO (indium tin oxide) and coated with 200 to 3000 Å-thick insulating films 13a and 13b of, e.g., $SiO_2$, $TiO_2$ or $Ta_2O_5$, and then with 50 to 1000 Å-thick alignment films 14a and 14b. The alignment films 14a and 14b have been subjected to rubbing with at least two rollers under conditions including rubbing density $\rho_1$ and a pressing depth $P_1$ for a first roller and a rubbing density $\rho_2$ and a pressing depth $P_2$ for a second roller, satisfying $\rho_1 < \rho_2$ and $P_1 > P_2$. Between the substrates 11a and 11b applied to each other with a sealing adhesive 17 is disposed a ferroelectric smectic liquid crystal 15 in a thickness of 0.1–3 μm. Such a small spacing between the substrates is held by spacer beads 16 (of e.g., silica or alumina).

In a specific example, two 1.1 mm-thick glass plates were respectively provided with ITO stripe electrodes and coated with a 1000 Å-thick $SiO_2$ insulating film for preventing short circuit between the substrates by sputtering and then with a polyimide-forming liquid, followed by baking to form an about 200 Å-thick polyimide alignment film. Then, alignment films of the two substrates were respectively subjected to rubbing with two rollers each having a rubbing cloth comprising nylon pile yarn about an 80 mm-dia. cylindrical roller under conditions including a rubbing density $\rho_1 = 25$ (–) and a pressing depth $P_1$ of 0.40 mm for a first rubbing roller and a rubbing density $\rho_2$ of 80 (–) and a pressing depth $P_2$ of 0.25 mm.

Then, one of the two substrates were dispersed 1.5 μm-dia. silica beads as spacers, and the other substrate carrying a sealing adhesive applied thereto at the periphery was applied thereto to form a cell, which was then filled with a phenylpyrimidine-based ferroelectric liquid crystal.

The cell was then entirely oriented to one optically stable state and then subjected to continual application of rectangular pulses of a pulse width of 25 µsec, a voltage amplitude of 40 volts and a duty ratio of 1/2 for about 7 hours. Thereafter, a maximum cell thickness increase along cell sides was measured, whereby only about 10% increase was observed.

Figure 3:
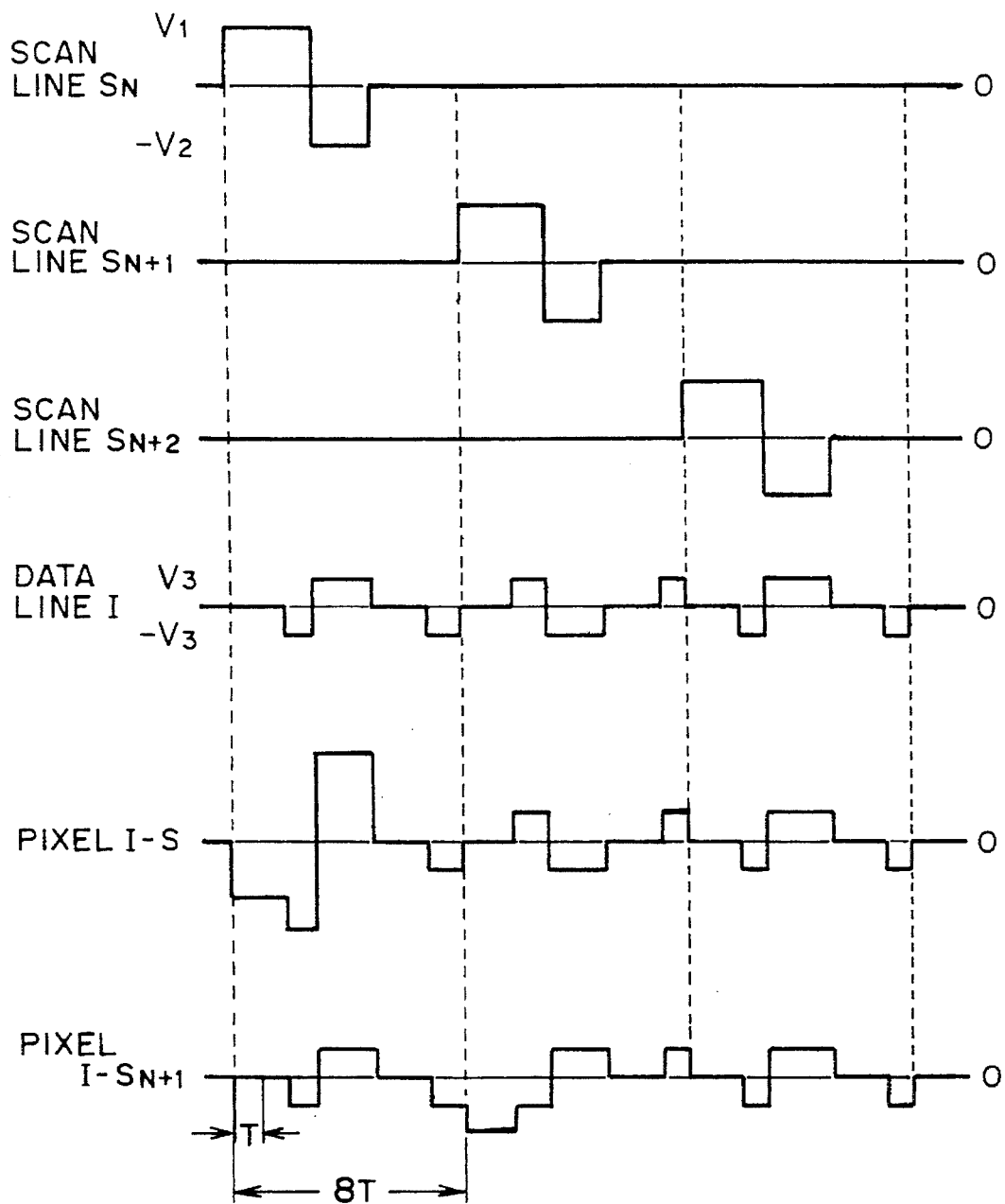
FIG. 3 is a waveform diagram showing a set of drive voltage waveforms used for measurement of drive margin.

Then, the cell was subjected to application of a set of drive signals for measurement of a drive margin shown in FIG. 3 including scanning voltage signals applied to scanning lines $S_N$–$S_{N+}$, for example, data signals applied to a data line I, for example, and voltage signals I–$S_N$ and I–$S_{N+1}$ applied to pixels at intersection of the scanning lines $S_N$ and $S_{N+1}$ with the data line I, wherein $V_1=10$ volts, $V_2=-10$ volts and $V_3=5$ volts.

Herein, some explanation is made to the drive margin, a unit pulse width for a set of drive signals shown in FIG. 3 is denoted by T (sec). Then, a sample cell sandwiched between a pair of cross nicol polarizers and then subjected to writing a white state and a black state while changing the unit pulse width T. As a result, a minimum pulse width $T_1$ and a maximum pulse width $T_2$ respectively capable of normally writing both white and black states are determined. From the measured value, a drive margin M defined as $M=(T_2-T_1)/(T_1+T_2)$ can be calculated. The drive margin becomes larger if the range for T ($=T_2-T_1$) allowing normal writing of both white and black states becomes wider, and the drive margin is used as a measure of drive performance of the sample cell (panel).

The above-prepared cell in this example showed $T_1=10$ µsec, $T_2=265.5$ µsec and accordingly a drive margin of 0.45 (=16.5/36.5).

Comparative Examples 3–17

Fifteen cells were prepared in a similar manner as in the above Example 3 except for changing the rubbing conditions $\rho_1$, $\rho_2$, $P_1$ and $P_2$ for the alignment films as shown in Table 2 below. Then, the respective cells filled with the same liquid crystal were subjected to measurement of the maximum cell thickness increase and the drive margin M. The results are also shown in the following Table 2.

As described hereinabove, according to the present invention, a periodical alignment irregularity in the form of stripes occurring due to an axial deviation of the rubbing roller, etc., can be obviated by using at least two rubbing rollers rotating at different numbers of revolutions per unit time, thus providing a ferroelectric liquid crystal device showing homogeneous initial molecular alignment and good bistability.

Further, according to the present invention, a liquid crystal device having good drive characteristics and display characteristics while minimizing the liquid crystal movement leading to a cell thickness increase or yellowing, can be obtained by rubbing an alignment film with at least two rubbing rollers equipped with an identical cloth, preferably under the conditions including $\rho_1<\rho_2$ and $P_1>P_2$.

What is claimed is:

1. A process for producing a liquid crystal device of the type including a liquid crystal disposed between a pair of electrode plates each having an alignment film thereon for aligning the liquid crystal, comprising rubbing the alignment film on at least one electrode plate with at least two rubbing rollers including at least two rubbing rollers rotating at different speeds in the same direction, each rubbing roller comprising a rubbing cloth wound about a roller.

2. A process according to claim 1, wherein said liquid crystal is a ferroelectric liquid crystal.

3. A process according to claim 1, wherein one of the two rubbing rollers rotating at different speeds rotates at a speed which is not an aliquot of the rotation speed of the other.

4. A process according to claim 1, wherein the two rollers rotating at different speeds have an identical diameter.

5. A process according to claim 1, wherein the two rollers rotating at different speeds have different diameters.

6. A process according to claim 1, wherein the two rollers rotating at different speeds comprise mutually different rubbing cloths.

7. A process for producing a liquid crystal device of the type including a liquid crystal disposed between a pair of electrode plates each comprising transparent electrodes and an alignment film successively disposed on a substrate, comprising:

TABLE 2

| | Comparative Example | | | | | | | | | | | | | | |
|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 |
| First rubbing | | | | | | | | | | | | | | | |
| P1 | 80 | 80 | 80 | 80 | 80 | 80 | 80 | 80 | 25 | 25 | 25 | 25 | 25 | 25 | 25 |
| P1 (mm) | 0.25 | 0.25 | 0.4 | 0.4 | 0.25 | 0.25 | 0.4 | 0.4 | 0.25 | 0.25 | 0.4 | 0.25 | 0.25 | 0.4 | 0.4 |
| Second rubbing | | | | | | | | | | | | | | | |
| P2 | 80 | 80 | 80 | 80 | 25 | 25 | 25 | 25 | 80 | 80 | 80 | 25 | 25 | 25 | 25 |
| P2 (mm) | 0.25 | 0.4 | 0.4 | 0.25 | 0.25 | 0.4 | 0.4 | 0.25 | 0.25 | 0.4 | 0.4 | 0.25 | 0.4 | 0.25 | 0.4 |
| Cell thickness increase (%) | 35 | 13 | 10 | 12 | 34 | 15 | 11 | 12 | 38 | 15 | 11 | 36 | 12 | 12 | 11 |
| Drive margin M | 0.46 | 0.21 | 0.20 | 0.35 | 0.33 | 0.35 | 0.34 | 0.32 | 0.44 | 0.22 | 0.22 | 0.44 | 0.34 | 0.31 | 0.30 |

EXAMPLE 4

A liquid crystal cell was prepared in the same manner as in Example 3 except that the alignment films were rubbed with a rubbing cloth comprising cotton pile yarn under the conditions of $\rho_1=50$, $P_1=0.5$ mm, $\rho_2$100 and $P_2=0.3$ mm. As a result, the cell showed a maximum cell thickness increase of 9% and a drive margin M of 0.42.

rubbing the alignment film plural times with at least two rubbing rollers rotating at different speeds in the same direction.

8. A process according to claim 7, wherein said liquid crystal is a ferroelectric liquid crystal.

9. A process according to claim 7, wherein said rubbing rollers are rubbed against the substrate at different pressing depths.

10. A process according to claim 9, wherein the pressing depth in former rubbing is larger than the pressing depth in latter rubbing.

11. A process according to claim 7, wherein said rubbing is performed under different rubbing densities $\rho$ defined as $\rho=(N\pi D+v)/|v|$, wherein N denotes a number of revolution per second of the roller (rps), D denotes a diameter of the roller (mm), and v denotes a relative speed between the substrate and roller.

12. A process according to claim 11, wherein the rubbing density in former rubbing is smaller than the rubbing density in latter rubbing.

13. A process according to claim 7, wherein said rubbing rollers have different diameters.

14. A process for producing a pair of electrode plates for constituting a liquid crystal device of the type including a liquid crystal disposed between the electrode plates, comprising: forming an alignment film on each of the electrode plates, and rubbing the alignment film on at least one electrode plate with at least two rubbing rollers including at least two rubbing rollers rotating at different speeds in the same direction, each rubbing roller comprising a rubbing cloth wound about a roller.

15. A process according to claim 14, wherein one of the two rubbing rollers rotating at different speeds rotates at a speed which is not an aliquot of the rotation speed of the other.

16. A process according to claim 14, wherein the two rollers rotating at different speeds have an identical diameter.

17. A process according to claim 14, wherein the two rollers rotating at different speeds have different diameters.

18. A process according to claim 14, wherein the two rollers rotating at different speeds comprise mutually different rubbing cloths.

19. A process according to claim 14, wherein said rubbing rollers are rubbed against the electrode plate at different pressing depths.

20. A process according to claim 19, wherein the pressing depth in former rubbing is larger than the pressing depth in latter rubbing.

21. A process according to claim 14, wherein said rubbing is performed under different rubbing densities $\rho$ defined as $\rho=(N\pi D+v)/|v|$, wherein N denotes a number of revolution per second of the roller (rps), D denotes a diameter of the roller (mm), and v denotes a relative speed between the substrate and roller.

22. A process according to claim 21, wherein the rubbing density in former rubbing is smaller than the rubbing density in latter rubbing.

23. A process for producing a liquid crystal device of the type including a liquid crystal disposed between a pair of electrode plates each comprising transparent electrodes and an alignment film successively disposed on a substrate, comprising: rubbing the alignment film with a rubbing roller plural times under different conditions, wherein different conditions include different rubbing densities P defined as $P=(N\pi D+v)/|v|$, wherein N denotes a number of revolution per second of the roller (rps), D denotes a diameter of the roller (mm), and v denotes a relative speed between the substrate and roller.

24. A process according to claim 23, wherein the rubbing density in former rubbing is smaller than the rubbing density in latter rubbing.

* * * * *

UNITED STATES PATENT AND TRADEMARK OFFICE
CERTIFICATE OF CORRECTION

PATENT NO. : 5,455,695
DATED : October 3, 1995
INVENTOR(S) : YASUTO KODERA ET AL.

It is certified that error appears in the above-identified patent and that said Letters Patent is hereby corrected as shown below:

COLUMN 6

Line 42, "$P_1>P_2$. Between" should read --$P_1>P_2$. ¶ Between--.

COLUMN 7

Line 64, "$\rho_2 100$" should read --$\rho_2=100$--.

COLUMN 10

Line 23, "densities P" should read --densities $\rho$--.
Line 24, "$P=(N\pi D+v)/|v|$," should read --$\rho=(N\pi D+v)/|v|$,--.

Signed and Sealed this

Twenty-seventh Day of February, 1996

Attest:

BRUCE LEHMAN

Attesting Officer        Commissioner of Patents and Trademarks